United States Patent
Manthoulis et al.

(10) Patent No.: US 7,958,208 B2
(45) Date of Patent: Jun. 7, 2011

(54) SYSTEM AND METHOD FOR DESIGNING A CUSTOMIZED SWITCHED METRO ETHERNET DATA NETWORK

(75) Inventors: Orestis Manthoulis, Sausalito, CA (US); Stuart Lynch Blackburn, San Ramon, CA (US); Laxman Sahasrabuddhe, Davis, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1141 days.

(21) Appl. No.: 10/947,051

(22) Filed: Sep. 22, 2004

(65) Prior Publication Data

US 2006/0062211 A1 Mar. 23, 2006

(51) Int. Cl.
 *G06F 15/177* (2006.01)
(52) U.S. Cl. ........ 709/221; 709/223; 709/226; 370/254; 705/7; 705/348
(58) Field of Classification Search ................ 709/249, 709/220–223, 252, 224, 226, 200; 370/254–256, 370/401, 238–238.1, 395.53, 407–408, 419–420, 370/425; 714/41, 745; 702/182–186; 703/1–6, 703/13–16, 21; 705/7, 348
 See application file for complete search history.

(56) References Cited

U.S. PATENT DOCUMENTS

| | | | |
|---|---|---|---|
| 4,926,418 A | 5/1990 | Cidon et al. | |
| 5,216,591 A | 6/1993 | Nemirovsky et al. | |
| 5,280,607 A * | 1/1994 | Bruck et al. ............ | 714/4 |
| 5,684,800 A | 11/1997 | Dobbins | |
| 5,774,876 A | 6/1998 | Woolley et al. | |
| 5,804,810 A | 9/1998 | Woolley et al. | |
| 5,825,772 A | 10/1998 | Dobbins | |
| 5,867,494 A | 2/1999 | Krishnaswamy et al. | |
| 5,867,495 A | 2/1999 | Elliott et al. | |
| 5,892,441 A | 4/1999 | Woolley et al. | |
| 5,946,308 A | 8/1999 | Dobbins | |
| 5,949,788 A | 9/1999 | Friedman | |
| 5,959,568 A | 9/1999 | Woolley | |
| 5,979,757 A | 11/1999 | Tracy et al. | |
| 5,999,525 A | 12/1999 | Krishnaswamy et al. | |
| 6,044,075 A | 3/2000 | Le Boudec | |
| 6,084,528 A | 7/2000 | Beach et al. | |

(Continued)

OTHER PUBLICATIONS

"IEEE Standards for Local and Metropolitan Area Networks: Virtual Bridge Local Area Networks", LAN MAN Standards Committee of the IEEE Computer Society, Dec. 8, 1998, 34p, IEEE Std 802.1q-1998, The Institute of Electrical and Electronics Engineers, New York, New York, United States of America.

(Continued)

*Primary Examiner* — William C Vaughn, Jr.
*Assistant Examiner* — Greg Bengzon
(74) *Attorney, Agent, or Firm* — Toler Law Group

(57) ABSTRACT

A method for automatically designing a switched metro Ethernet data is provided. During execution of the method, data network information, customer demand information, equipment information, and at least one design constraint is received. Based thereon, a potential topology design for the switched metro Ethernet data network is automatically established. The potential topology for the switched metro Ethernet data network can be a tree topology that is rooted at a predetermined hub node and that has a plurality of leaves. Each leaf is located at a customer location. In a particular embodiment, an aggregation node is placed at the hub node. Further, an aggregation node is placed at a predetermined redundant hub node. Additionally, an aggregation node is placed at another location in the tree topology.

31 Claims, 6 Drawing Sheets

U.S. PATENT DOCUMENTS

| | | | |
|---|---|---|---|
| 6,092,113 | A | 7/2000 | Maeshima |
| 6,104,701 | A | 8/2000 | Avargues |
| 6,112,251 | A | 8/2000 | Rijhsinghani |
| 6,122,283 | A * | 9/2000 | Lee ............................... 370/408 |
| 6,125,420 | A * | 9/2000 | Eidson ........................... 710/242 |
| 6,147,995 | A | 11/2000 | Dobbins |
| 6,151,305 | A * | 11/2000 | Chen .............................. 370/238 |
| 6,151,324 | A | 11/2000 | Belser |
| 6,199,753 | B1 | 3/2001 | Tracy et al. |
| 6,208,649 | B1 | 3/2001 | Kloth |
| 6,335,927 | B1 | 1/2002 | Elliott et al. |
| 6,363,319 | B1 | 3/2002 | Hsu |
| 6,374,307 | B1 | 4/2002 | Ristau et al. |
| 6,377,551 | B1 | 4/2002 | Luo |
| 6,522,641 | B1 | 2/2003 | Siu et al. |
| 6,550,672 | B1 | 4/2003 | Tracy et al. |
| 6,597,214 | B1 | 7/2003 | Singh et al. |
| 6,631,019 | B1 | 10/2003 | Vujkovic-Cvijin et al. |
| 6,633,573 | B1 | 10/2003 | Ben-Zur et al. |
| 6,681,232 | B1 | 1/2004 | Sistanizadeh et al. |
| 6,687,339 | B2 | 2/2004 | Martin |
| 6,690,848 | B2 | 2/2004 | Graves et al. |
| 6,697,793 | B2 | 2/2004 | McGreevy |
| 6,721,728 | B2 | 4/2004 | McGreevy |
| 6,731,625 | B1 | 5/2004 | Eastep et al. |
| 6,731,832 | B2 | 5/2004 | Alvarez et al. |
| 6,741,615 | B1 | 5/2004 | Patwardhan et al. |
| 6,741,981 | B2 | 5/2004 | McGreevy |
| 6,754,174 | B1 | 6/2004 | Ben-Zur et al. |
| 6,754,175 | B1 * | 6/2004 | Akinpelu et al. .............. 370/228 |
| 6,754,181 | B1 | 6/2004 | Elliott et al. |
| 6,763,025 | B2 | 7/2004 | Leatherbury et al. |
| 6,778,498 | B2 | 8/2004 | McDysan |
| 6,804,199 | B1 | 10/2004 | Kelly |
| 6,826,158 | B2 * | 11/2004 | Seaman et al. ................. 370/254 |
| 6,879,564 | B2 * | 4/2005 | Parham et al. ................. 370/256 |
| 6,912,232 | B1 | 6/2005 | Duffield |
| 6,912,592 | B2 * | 6/2005 | Yip ................................ 709/249 |
| 6,914,905 | B1 | 7/2005 | Yip |
| 6,963,575 | B1 | 11/2005 | Sistanizadeh |
| 6,973,072 | B1 * | 12/2005 | Muntz ........................... 370/351 |
| 6,976,087 | B1 | 12/2005 | Westfall |
| 7,028,083 | B2 | 4/2006 | Levine |
| 7,092,389 | B2 | 8/2006 | Chase |
| 7,136,351 | B2 | 11/2006 | Metin |
| 7,246,178 | B2 * | 7/2007 | Roberts et al. ................. 709/249 |
| 7,249,169 | B2 * | 7/2007 | Blouin et al. .................. 709/220 |
| 7,349,985 | B2 | 3/2008 | Gilmartin |
| 7,502,839 | B2 * | 3/2009 | O'Sullivan et al. ............ 709/220 |
| 7,583,796 | B2 * | 9/2009 | Tomikawa et al. ........ 379/221.02 |
| 7,646,730 | B2 * | 1/2010 | Cankaya et al. ............... 370/254 |
| 2001/0003833 | A1 | 6/2001 | Tomizawa |
| 2002/0042274 | A1 | 4/2002 | Ades |
| 2002/0054595 | A1 | 5/2002 | Ambe |
| 2002/0055989 | A1 * | 5/2002 | Stringer-Calvert et al. .. 709/220 |
| 2002/0091795 | A1 * | 7/2002 | Yip ................................ 709/218 |
| 2002/0120727 | A1 | 8/2002 | Curley |
| 2002/0126690 | A1 | 9/2002 | Narayana |
| 2002/0191250 | A1 | 12/2002 | Graves |
| 2003/0067928 | A1 | 4/2003 | Gonda |
| 2003/0149788 | A1 | 8/2003 | Saint Etienne |
| 2003/0169694 | A1 | 9/2003 | Seaman |
| 2003/0172145 | A1 * | 9/2003 | Nguyen ......................... 709/223 |
| 2003/0172188 | A1 | 9/2003 | Hasegawa |
| 2004/0042416 | A1 | 3/2004 | Ngo |
| 2004/0058652 | A1 | 3/2004 | McGregor |
| 2004/0062198 | A1 | 4/2004 | Pedersen |
| 2004/0081180 | A1 | 4/2004 | De Silva |
| 2004/0083277 | A1 * | 4/2004 | Chaporkar et al. ............ 709/220 |
| 2004/0098500 | A1 | 5/2004 | Liu |
| 2004/0098501 | A1 * | 5/2004 | Finn .............................. 709/236 |
| 2004/0103282 | A1 | 5/2004 | Meier |
| 2004/0146006 | A1 | 7/2004 | Jackson |
| 2004/0156322 | A1 * | 8/2004 | Mehra ........................... 370/254 |
| 2004/0186696 | A1 * | 9/2004 | Alicherry et al. .................. 703/1 |
| 2004/0196790 | A1 | 10/2004 | Balakrishnan |
| 2004/0210623 | A1 | 10/2004 | Hydrie |
| 2004/0221042 | A1 | 11/2004 | Meier |
| 2004/0246976 | A1 | 12/2004 | Balakrishnan |
| 2004/0249916 | A1 | 12/2004 | Graves |
| 2005/0021766 | A1 | 1/2005 | McKeowen |
| 2005/0025069 | A1 * | 2/2005 | Aysan ........................... 370/254 |
| 2005/0027851 | A1 | 2/2005 | McKeowen |
| 2005/0063397 | A1 * | 3/2005 | Wu et al. ....................... 370/401 |
| 2005/0066036 | A1 * | 3/2005 | Gilmartin ...................... 709/226 |
| 2005/0086285 | A1 | 4/2005 | Balasubramanian et al. 709/200 |
| 2005/0132026 | A1 * | 6/2005 | Govil ............................. 709/220 |
| 2005/0160180 | A1 * | 7/2005 | Rabje et al. ................... 709/238 |
| 2009/0276510 | A1 * | 11/2009 | Manthoulis et al. .......... 709/220 |

OTHER PUBLICATIONS

Martin, Richard P., et al. "Effects of Communication Latency, Overhead, and Bandwidth in a Cluster Architecture." University of California, Berkeley: Computer Science Division. International Symposium on Computer Architecture: pp. 85-97; 1997.

Fineburg, Victoria. "A Practical Architecture for Implementing End-to-End QoS in an IP Network." IEEE Communications Magazine: pp. 122-130. Jan. 2002.

U.S. Appl. No. 10/720,664, Titled: Method, System and Computer Program Product for Calculating a VLAN Latency Measure.

U.S. Appl. No. 10/666,069, Titled: Method, System and Computer Program Product for Facilitating the Design and Assignment of Ethernet VLANS.

U.S. Appl. No. 10/667,009, Titled: Method, System and Computer Program Product for Providing Ethernet VLAN Capacity Requirement Estimation.

U.S. Appl. No. 10/866,011, Titled: Methods, Systems and Computer Program Products for Facilitating the Design and Analysis of Virtual Networks Based on Total HUB Value.

Kruse, James and Keith Ross, "Cross Networking, A Top-Down Approach Featuring the Internet", 2001, Addison Wesley Longman; Inc. pp. 280-281.

* cited by examiner

SYSTEM AND METHOD FOR DESIGNING A CUSTOMIZED SWITCHED METRO ETHERNET DATA NETWORK

FIELD OF THE INVENTION

The present disclosure relates generally to the design of switched metro Ethernet data networks.

BACKGROUND

Ethernet is a local-area network architecture that was developed in the late 1970s for use in offices, e.g., to interconnect computers to each other and to a common printer. In recent years, companies have begun to develop ways to expand Ethernet principles to wide area networks, e.g., using Internet routers that are interconnected in various ways. The result has been the creation of switched metro Ethernet data networks.

Depending on the topology used, finding the most optimal topology for a switched metro Ethernet data network can be NP-complete and can only be solved via an exhaustive search. Performing such an exhaustive search is impractical since the time of the search increases exponentially as the size of the data network increases. As a result, methods for designing switched metro Ethernet data networks typically utilize a manual per-network approach to establish a data network design. This manual approach can be time consuming, expensive, and can result in inefficient network designs.

Accordingly, there is a need for an improved system and method for designing a customized switched metro Ethernet data network.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Figure 1:
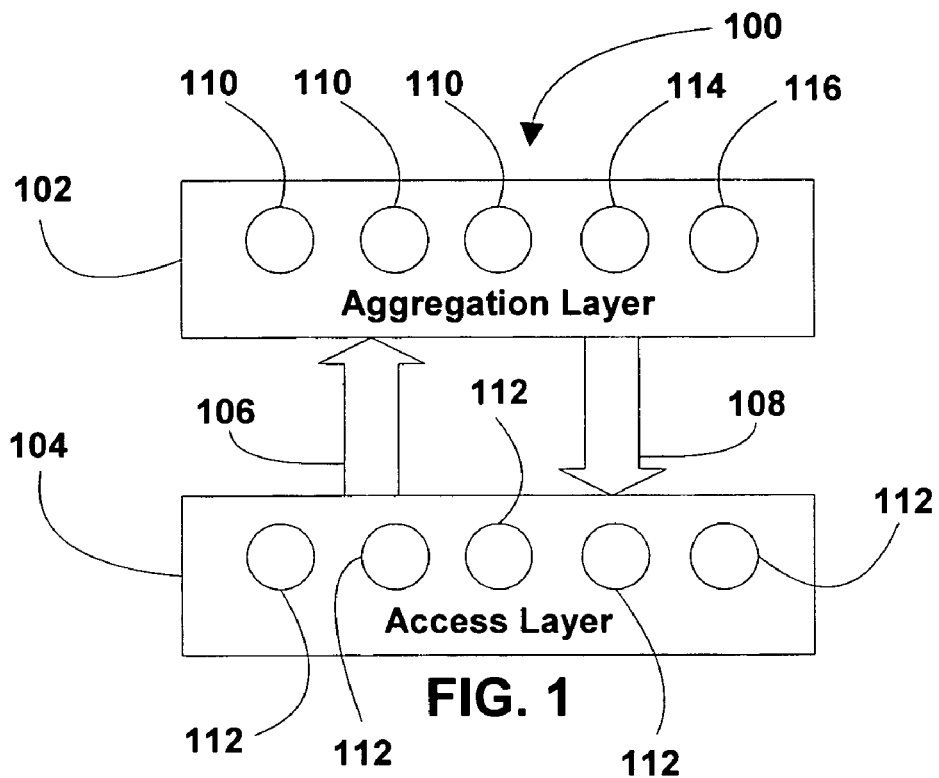
FIG. 1 is a diagram of an exemplary customized switched metro Ethernet (CSME) data network.

A method for automatically designing a switched metro Ethernet data is provided. During execution of the method, data network information, customer demand information, equipment information, and at least one design constraint is received. Based thereon, a potential topology design for the switched metro Ethernet data network is automatically established.

In a particular embodiment, the potential topology for the switched metro Ethernet data network is a tree topology that is rooted at a predetermined hub node and that has a plurality of leaves. Each leaf is located at a customer location. In a particular embodiment, an aggregation node is placed at the at the hub node. Further, an aggregation node can be placed at a predetermined redundant hub node. Additionally, an aggregation node is placed at at least one other location in the tree topology.

In a particular embodiment, a first cost of placing an aggregation node at the other location in the tree topology is determined. Also, a second cost of connecting other locations in the tree topology to the parent node of an aggregation node that could potentially be placed at this location is determined. An aggregation node is placed at this location in the tree topology when the second cost is greater than the first cost.

Further, in a particular embodiment, an availability value is computed for each aggregation node in the tree topology other than the hub node and the redundant hub node. A redundant path is added from the aggregation node to the hub node when the availability value is less than a predetermined threshold. The redundant path can be added by determining a first path from a particular node to the parent node of the particular node and connecting the particular node to a next closest node other than the parent node by a second path that is different from the first path.

In a particular embodiment, an aggregation node-to-aggregation node link is sized by dividing an aggregate customer bandwidth by a concentration ratio. Further, a detailed configuration of each aggregation node is determined. Thereafter, a cost of the potential topology of the switched metro Ethernet data network is determined. The cost of the potential topology can then be output for use, e.g., by a network engineer.

In another embodiment, a method for designing a switched metro Ethernet data network is provided. Using the method, a non-redundant tree topology for a switched metro Ethernet data network is established at least partially within a set of existing nodes. Based on an availability constraint, one or more redundant connections can be added to the at least one non-redundant tree topology.

In yet another embodiment, a system for designing a switched metro Ethernet data network is provided and includes a computer processor and a computer readable memory that is accessible to the computer processor. A computer program for designing a switched metro Ethernet data network can be embedded within the memory. In this embodiment, the computer program includes instructions to receive one or more user inputs related to the switched metro Ethernet data network. Further, the computer program includes instructions to generate a non-redundant tree topology for the switched metro Ethernet data network at least partially based on the one or more user inputs. The computer program also includes instructions to add one or more redundant connections to the non-redundant tree topology to create a design. Additionally, the computer program includes instructions to output at least one design output related to the design.

In still another embodiment, a switched metro Ethernet data network is provided and includes at least one hub node. A plurality of customer nodes is connected to the hub node to establish a tree topology. In this embodiment, a design of the tree topology is generated using a switched metro Ethernet data network design tool. Further, the switched metro Ethernet data network design tool includes instructions to generate a non-redundant tree topology for the switched metro Ethernet data network at least partially based on one or more user inputs and instructions to add one or more redundant connections to the non-redundant tree topology to create the design.

Referring to FIG. 1, a customized switched metro Ethernet (CSME) data network is shown and is designated 100. As illustrated in FIG. 1, the CSME data network 100 includes an aggregation layer 102 and an access layer 104. In a particular embodiment, the access layer 104, a.k.a., provider edge—customer location equipment (PE-CLE), provides the interface to a customer at the customer's location. Further, in a particular embodiment, the aggregation layer 102, a.k.a., provider edge—point of presence (PE-POP), aggregates incoming traffic 106 from the access layer 104 and forwards outgoing traffic 108 to the access layer. The CSME data network 100 can provide virtual private local area network (LAN) connection, e.g., point-to-point, point-to-multipoint, and multipoint-to-multipoint, between customer sites.

As indicated in FIG. 1, the aggregation layer 102 can include a plurality of aggregation nodes 110. In an illustrative embodiment, the aggregation nodes 110 can include data communication equipment (DCE), such as any of the 7600 series Internet routers by Cisco, that can be used to route, switch, or otherwise transmit data packets between the aggregation nodes 110. The access layer 104 can include a plurality of access nodes 112. In an illustrative embodiment, the access nodes 112 can include data termination equipment (DTE), i.e., one or more devices that are the source or destination of data packets.

Figure 2:
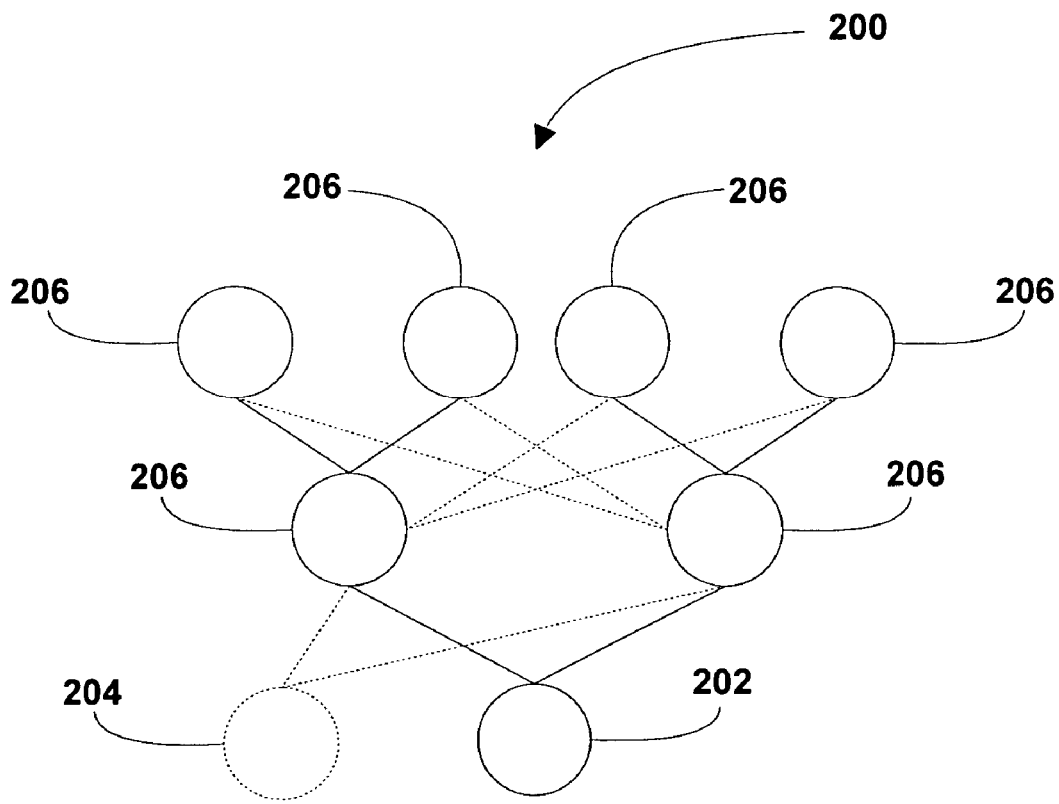
FIG. 2 is a diagram of a tree topology for the CSME data network.

In a particular embodiment, the aggregation nodes 110 can provide interfaces to the access nodes 112 and other aggregation nodes 110. In an illustrative embodiment, the aggregation nodes 110 can be interconnected in a tree fashion, as shown in FIG. 2, in order to route data traffic between the aggregation nodes 110 and the access nodes 112 connected thereto. If data traffic is between two access nodes 112 that are connected to the same aggregation node 110, the data traffic is routed or switched between the two access nodes 112 via that particular aggregation node 110 to which those access nodes 112 are connected.

In a particular embodiment, the aggregation layer 102 includes a hub node 114, e.g., a node in a central office, and a redundant hub node 116, e.g., another node in a central office. Further, in a particular embodiment, the CSME data network 100 can have a tree topology, shown in detail in FIG. 2, that is rooted at the hub node 114, unless availability requirements require some of the aggregation nodes 110 to have redundant connections, i.e., connections to the redundant hub node 116. For other topologies, e.g., star topology, bus topology, and ring topology, the spanning tree protocol (STP) may be used in order to prevent looping of data packets in the data network.

FIG. 2 shows an exemplary, non-limiting CSME data network, designated 200, that is deployed in a tree topology. As illustrated, the CSME data network 200 includes a hub node 202 and a redundant hub node 204. A plurality of aggregator nodes 206 is connected to the hub node 202 in a tree configuration. In other words, aggregator nodes 206 can be connected to the hub node 202 and other aggregator nodes 206 can be connected to each of these aggregator nodes 206. This pattern can be repeated and the branches of the "tree" can grow more complex. As further shown in FIG. 2, one or more aggregator nodes 206 can also be connected to the redundant hub node 204 in addition to the hub node 202.

Figure 3:
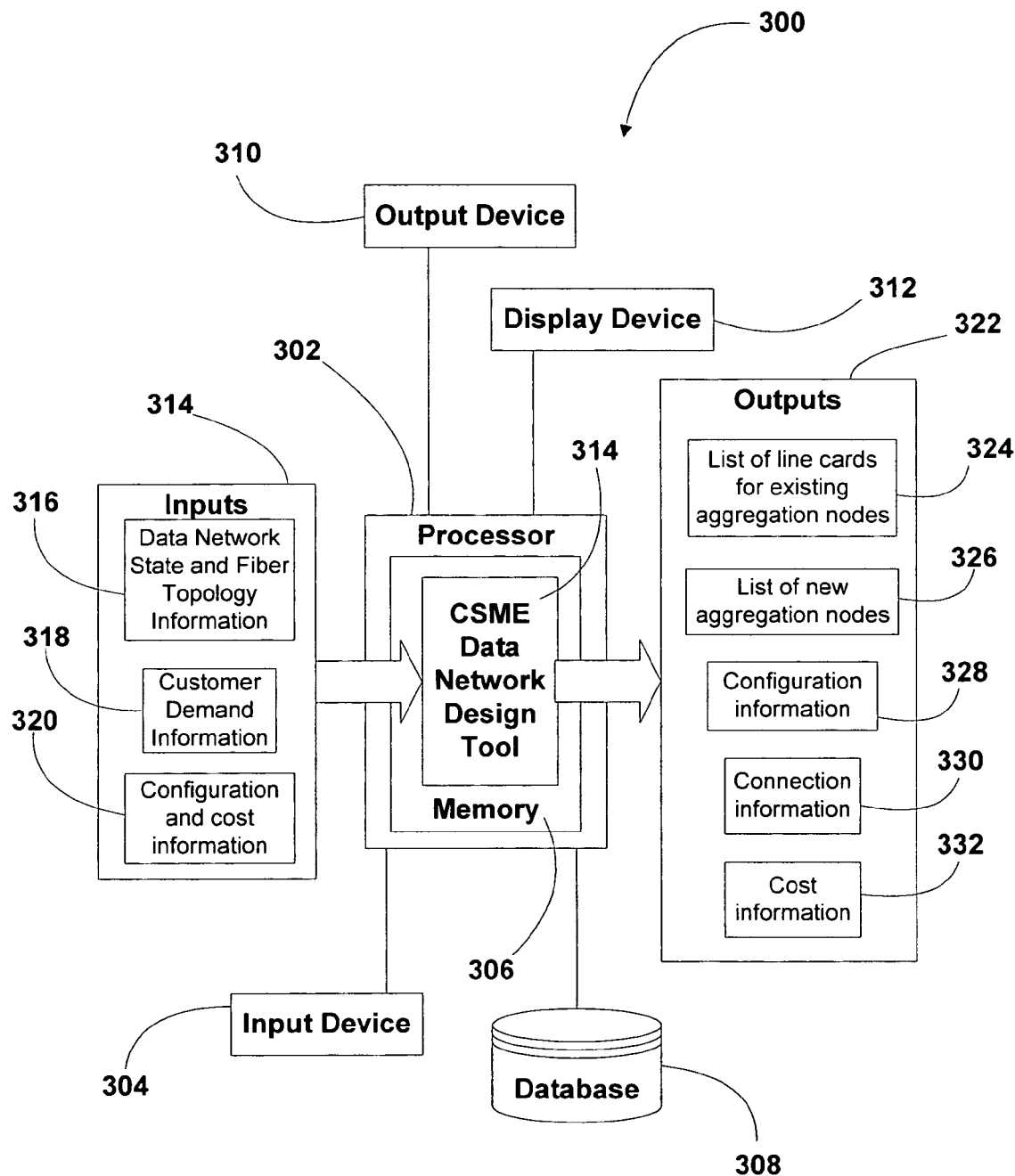
FIG. 3 is a diagram of an exemplary system for designing a CSME data network.

Referring now to FIG. 3, a system for designing a CSME data network is shown and is generally designated 300. As illustrated in FIG. 3, the system 300 includes a processor 302, e.g., a desk top computer, a lap top computer, a portable digital assistant (PDA), etc. An input device 304, e.g., a keyboard, a mouse, a light pen, or a scanner, is connected to the processor 300. Further, a memory 306 is connected to the processor 302. In a particular embodiment, the memory can be an external memory or an internal memory. FIG. 3 also shows a database 308 that can be connected to the microprocessor 302.

As further depicted in FIG. 3, the system 300 can include an output device 310 that is connected to the processor. In a particular embodiment, the output device 310 is a printer. FIG. 3 further shows that the system 300 can include a display device 312, e.g., a monitor, that is connected to the processor 302. Additionally, the system 300 can include a CSME data network design tool 314 within the processor 302. In a particular embodiment, the CSME data network design tool 314 is a computer program that is embedded within the memory 306 within the processor 302. The CSME data network design tool 314 includes a plurality of steps that can be performed by the processor 302 in order to design a CSME data network.

FIG. 3 also illustrates several inputs 316 that can be input to the processor, particularly the CSME data network design tool 314. The inputs 316 can be used by the CSME data network design tool 314 to design a CSME data network. In an illustrative embodiment, the inputs 316 can include data network state and fiber topology information 318. The data network state and fiber topology information 318 can include fiber topology information, such as the number of spare nodes and distance information between nodes. Further, the data network state and fiber topology information 318 can also include a list of central offices that can be used for aggregation nodes.

As indicated in FIG. 3, the inputs 314 to the CSME data network design tool 306 also include customer demand information 318. In a particular embodiment, the customer demand information 318 includes the number and aggregate bandwidth of customers for each serving wire center. In an illustrative embodiment, the inputs 314 to the CSME data network design tool 306 can include configuration and cost information 320 that can include types of data network elements, e.g., a 7609 with 4 port cards or 16 port cards, etc. Further, the configuration and cost information 320 can include equipment cost, line card cost, fiber cost, etc.

FIG. 3 further shows that the CSME data network design tool 306 can include a plurality of outputs 322. In a particular embodiment, the outputs 322 can include a list of line cards for aggregation nodes 324, e.g., line cards that need to be deployed in existing aggregation nodes. Further, the outputs 322 can include a list of new aggregation nodes 328. Also, the outputs 322 can include configuration information 328 for the new aggregation nodes. In a particular embodiment, the outputs 322 can also include connection information 330, e.g., port level connection information for the new equipment. The port level connection information indicates how to interconnect particular port numbers on particular line cards of particular nodes. FIG. 3 further indicates that the outputs 322 can include cost information 332, e.g., total cost of equipment and a breakdown of those costs by equipment type.

Figure 4:
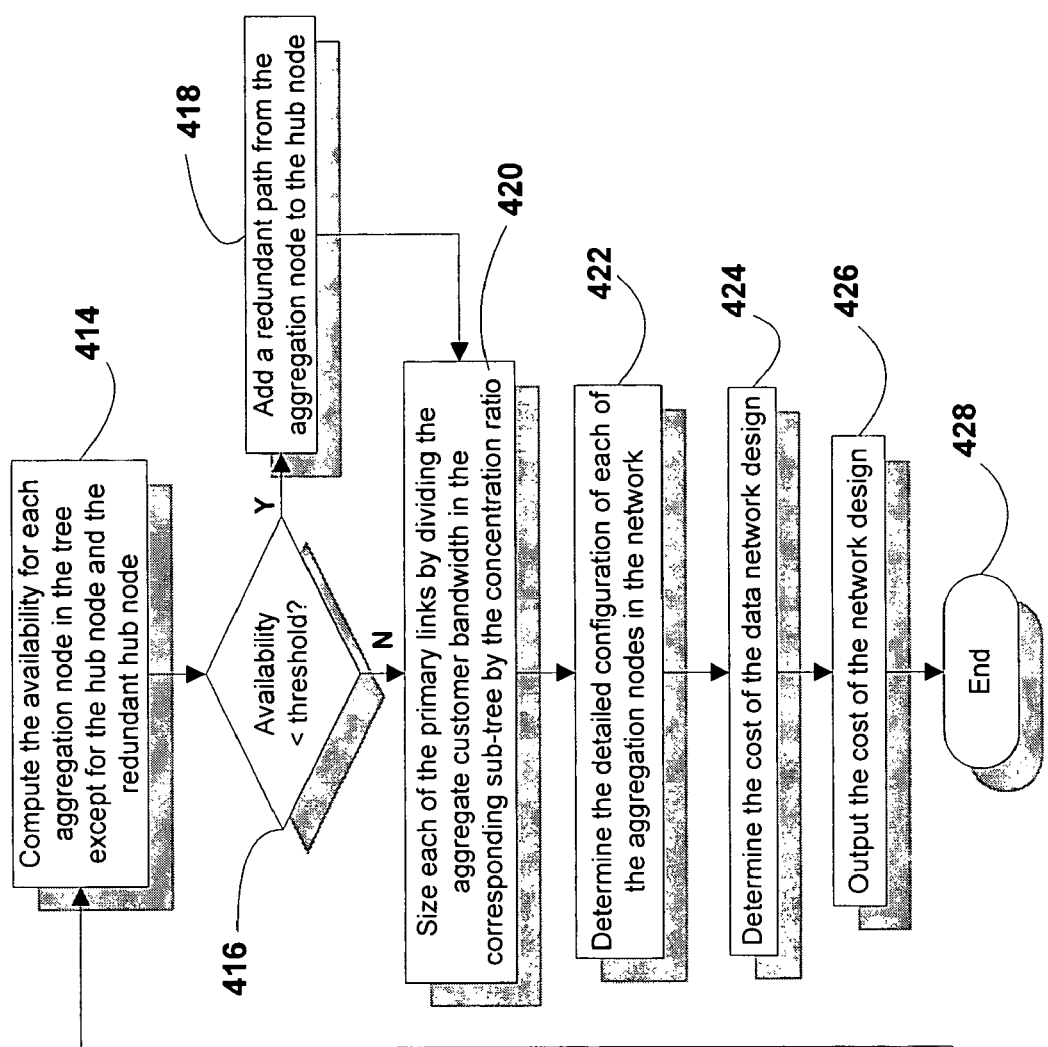
FIG. 4 is a flow chart to illustrate an exemplary method for designing a CSME data network.
Figure 4:
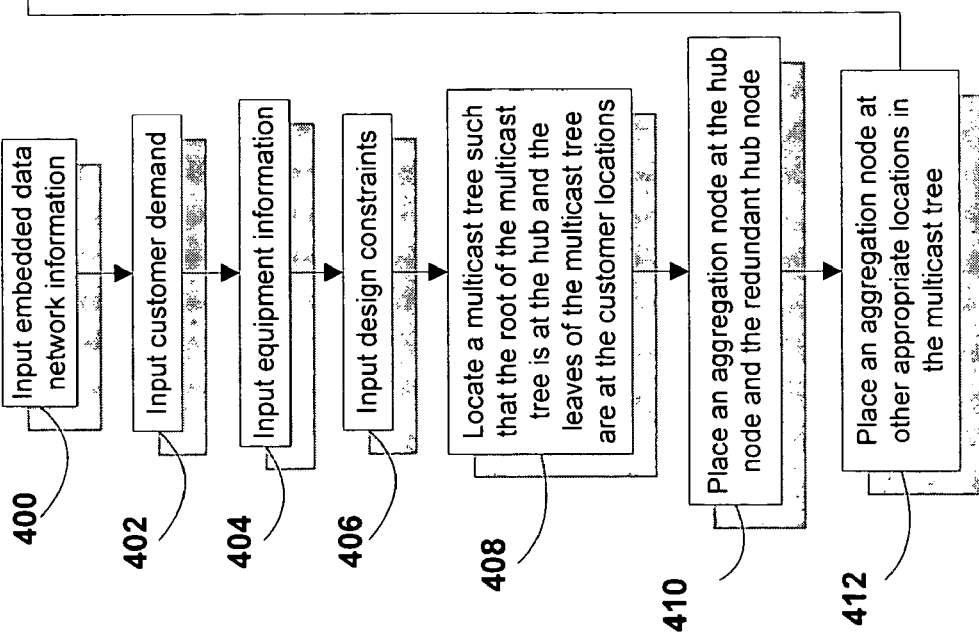

FIG. 4 shows an exemplary, non-limiting embodiment of a method for designing a CSME data network. Commencing at block 400, embedded data network information is input to the design tool. In a particular embodiment, the embedded data network information can be used to build a current data network state and fiber topology. The fiber topology can be extracted from a trunk integrated record keeping system (TIRKS). Also, the configuration and connection pattern of the existing core and aggregation nodes can be extracted from an element management system (EMS). Next, at block 402, customer demand information is input to the design tool. At block 404, equipment information is input to the design tool. Moving to block 406, one or more design constraints are input to the design tool. For example, the design constraints can include a maximum allowable distance between two aggregation nodes or a maximum amount of data traffic through a particular aggregation node.

Figure 5:
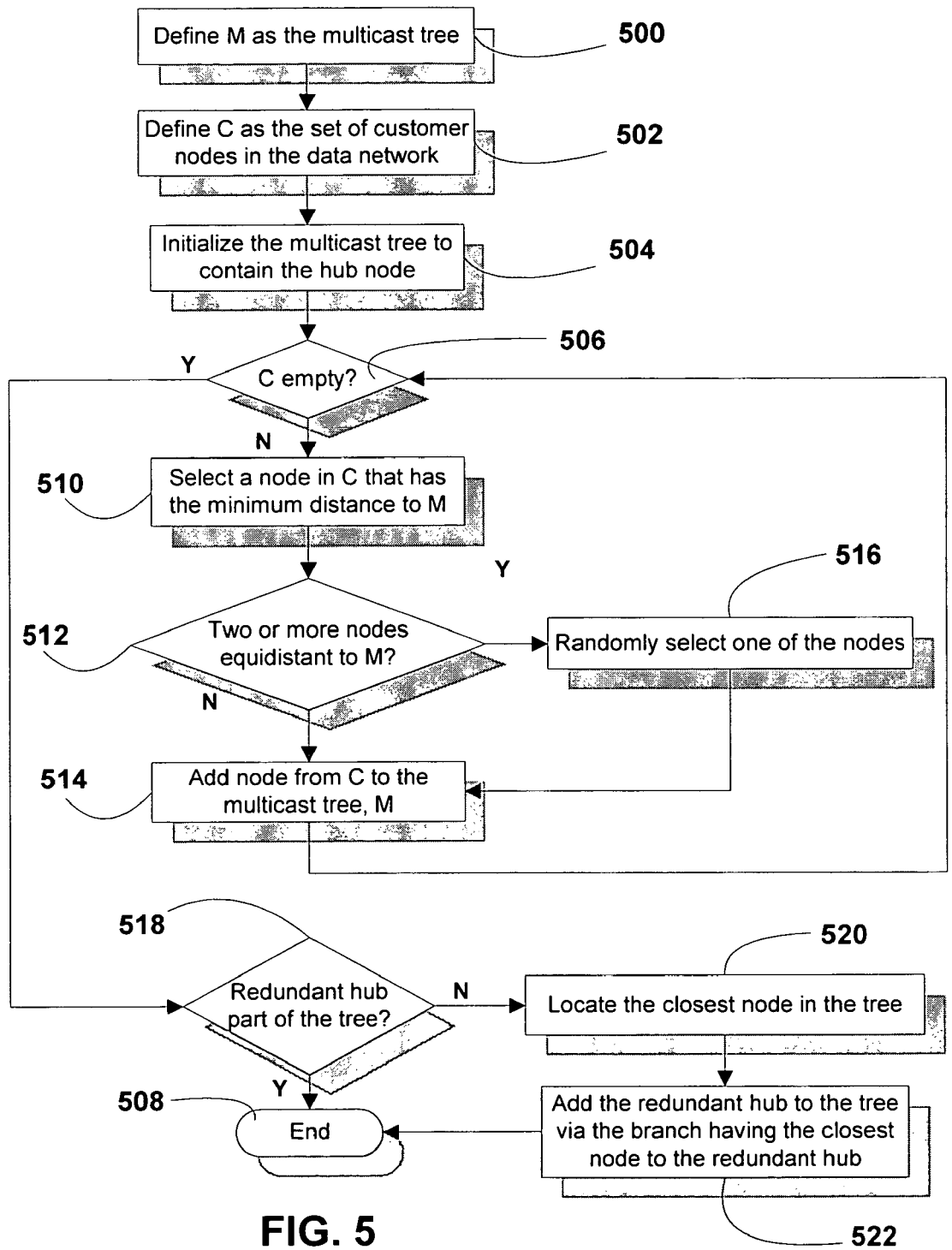
FIG. 5 is a flow chart to illustrate a method for locating a multicast tree.
Figure 6:
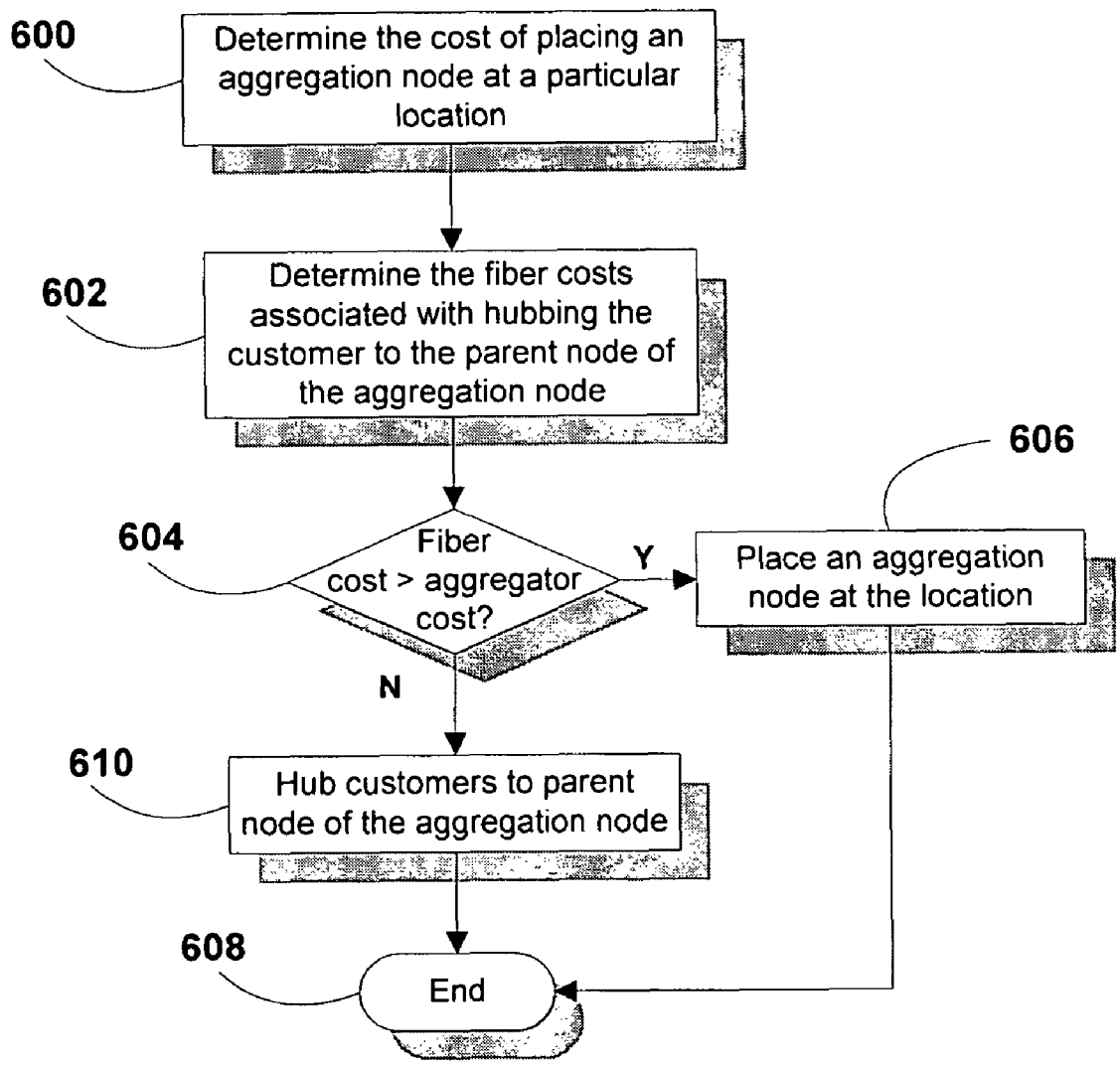
FIG. 6 is a flow chart to illustrate a method for determining where to place aggregation nodes in the multicast tree.

Proceeding to block 408, a multicast tree topology without redundancy is located within the existing nodes. In an illustrative embodiment, the "root" of the tree topology is located at a predetermined hub node and the "leaves" of the tree topology are located at one or more customer locations, i.e., access nodes. FIG. 5, discussed in detail below, illustrates an algorithm for locating the multicast tree within the existing nodes. Referring back to FIG. 4, at block 410, an aggregation node is placed at the hub of the multicast tree and the redundant hub of the multicast tree. At block 412, an aggregation node is placed at other appropriate locations in the multicast tree. FIG. 6 illustrates a method for determining where to locate other aggregation nodes in the multicast tree topology. The aggregation-to-aggregation links created during the design of the non-redundant tree topology can be considered primary links.

Moving to block 414, the availability for each aggregation location in the tree is computed. The availability is a measure of how much data traffic that a particular aggregation node can handle. At decision step 416, a decision is made in order to ascertain whether the availability is less than a predetermined threshold. If the availability is less than the predetermined threshold, the logic moves to block 418 and a redundant link is added from the aggregation location to the hub node. In a particular embodiment, redundancy can be added to the previously non-redundant tree topology using the method shown in FIG. 7. The logic then proceeds to block 420. If the availability is greater than the threshold at decision step 416, the logic also proceeds to block 420. At block 420, each primary link is sized by dividing the aggregate customer bandwidth in the corresponding sub-tree by the concentration ratio.

In an illustrative embodiment, each redundant link is sized to carry one unit of traffic. For example, in a gigabit Ethernet data network, each redundant link is sized to carry one gigabit per second of traffic. Proceeding to block 422, the detailed configuration of each aggregation node in the data network is determined. Thereafter, at block 424, the cost of the data network design is determined. At block 426, the cost of the data network design is output. The logic then ends at state 428.

FIG. 5 shows an exemplary, non-limiting embodiment of a method for locating a multicast tree. Beginning at block 500, M is defined as the multicast tree. At block 502, C is defined as the set of customer nodes in the data network. Moving to block 504, the multicast tree is initialized to contain the hub node. Thereafter, a decision step 506, a determination is undertaken in order to ascertain whether C is empty. If C is empty, the logic moves to decision step 518, described below. If C is not empty, the logic moves to block 510 and a node is selected that has the minimum distance to M. At step 512, a decision is made in order to determine whether there are two or more nodes that are equidistant to M. If there are not two or more nodes that are equidistant to M, the node from C is added to the multicast tree, M, at block 514. Conversely, if two or more nodes are equidistant to M, the logic moves to block 516 and one of the equidistant nodes is randomly selected. Then, continuing to block 514, the randomly selected node from the set C is added to the multicast tree, M. From block 514, the logic returns to decision step 506 and again, a decision is made in order to determine whether C is empty.

As stated above, if C is determined to be empty, at decision step 506, the logic proceeds to decision step 518 and a determination is made in order to determine whether the redundant hub is part of the multicast tree. If yes, the method ends at state 508. On the other hand, if the redundant hub is not part of the multicast tree, the closest node in the tree to the redundant hub is located. At block 522, the redundant hub is added to the tree via the branch having the closest node to the redundant hub. The logic then ends at state 508.

Referring now to FIG. 6, an exemplary, non-limiting embodiment of a method for determining where to place aggregation nodes in the multicast tree is shown and commences at block 600. At block 600, the costs associated with placing an aggregation node at a particular location are determined. Moving to block 602, the costs associated with fiber hubbing customers to the parent node of the aggregation node referenced in step 600 are determined. The parent node of a particular node is the first node in the path from the particular node to the hub node that is either a servicing wire center for a customer, the first node in the path from the particular node to the hub node that has a nodal degree greater than two nodes, or both. Next, at decision step 604, a determination is made in order to ascertain whether the fiber hubbing costs are greater than the aggregation costs. If the fiber costs are greater, the logic moves to block 606 and an aggregation node is placed at the particular location for which costs were determined in block 600 and block 602. The logic then ends at block 608. On the other hand, if the fiber costs are less than the aggregation costs, the customer is hubbed to the parent node of the aggregation node 610, e.g., using fiber optic cable. The logic then ends at state 608.

Figure 7:
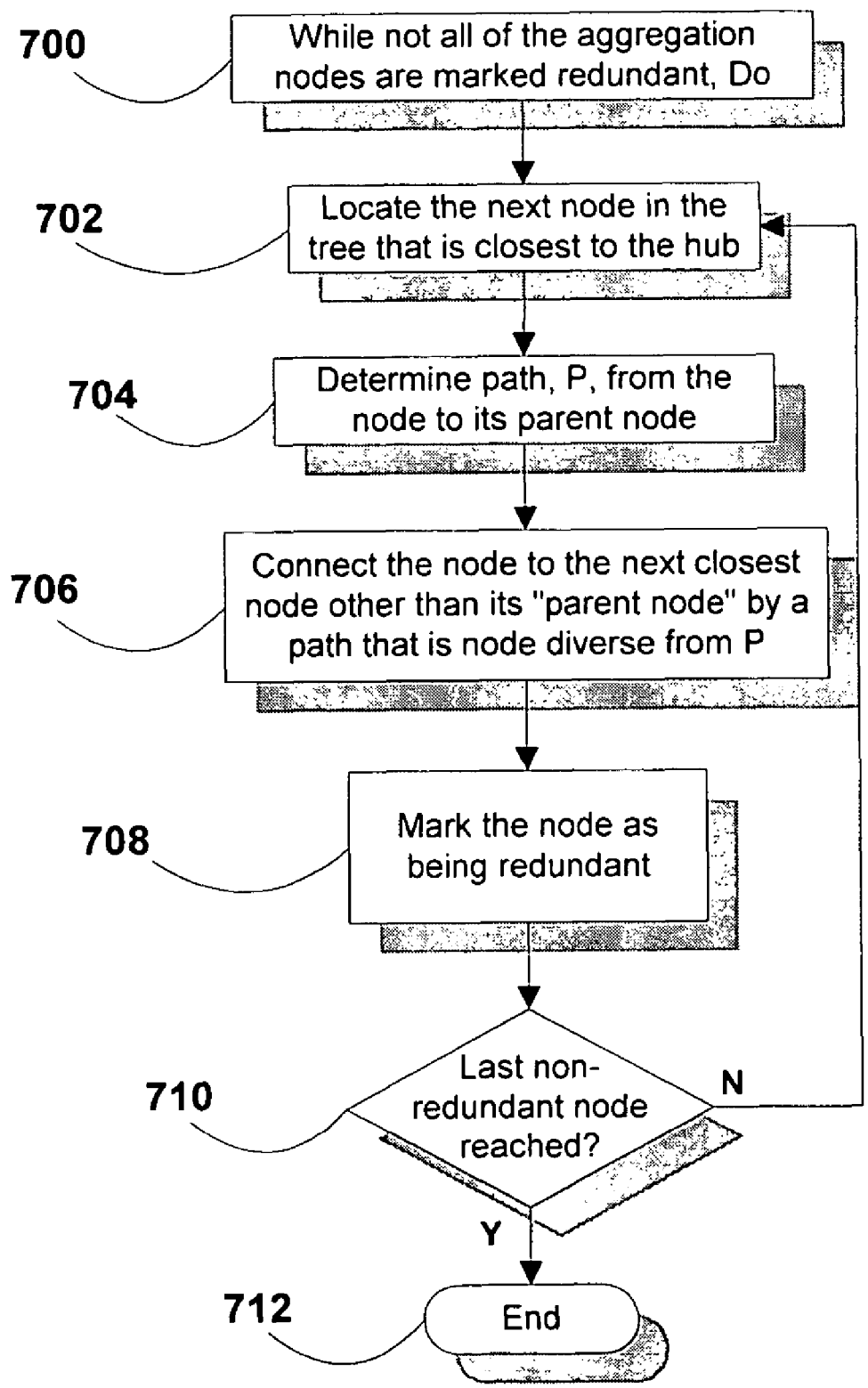
FIG. 7 is a flow chart to illustrate a method for adding redundancy to the multicast tree.

Referring to FIG. 7, an exemplary, non-limiting method embodiment for adding redundancy to the multicast tree is shown and commences at block 700 with a do loop wherein while not all of the aggregation nodes have been marked redundant, the following steps are performed. At block 702, the node in the tree that is closest to the hub is located. Then, at block 704, the path, P, from that node to its parent node is determined. At block 706, the node is connected to the next closest node other than its "parent node" by a path that is node diverse from P. Thereafter, at block 708, that node is marked, or otherwise flagged by the CSME data network design tool, as being redundant. Moving to decision step 710, a determination is made in order to ascertain if the last non-redundant node has been reached. If so, the logic ends at state 712. Otherwise, the logic returns to block 702 and continues for the node that is next closest to the hub.

With the configuration of structure described above, the system and method for designing a customized switched metro Ethernet data network provides a software tool for automatically designing a switched metro Ethernet data network based on a plurality of inputs to the software tool. Particularly, the tool first locates a non-redundant tree topology and then, adds redundancy as needed, e.g., based on the availability of the aggregation nodes. During the design of the switched metro Ethernet data network, a number of different data can be computed, e.g., traffic intensity along different paths, so that network design issues, such as load balancing may be handled accordingly.

The design tool described also provides an automated, substantially transparent, and auditable method for designing CSME data networks. Further, the design tool can allow a user to perform sensitivity analysis of a particular CSME data network design based on traffic forecasts, equipment prices, and fiber prices. A network design output by the design tool includes a completely drawn network topology that includes the locations of all customer nodes, hub nodes, aggregator nodes, and core nodes. Further, the completely drawn network topology includes the locations of all primary and secondary connections, fiber lengths of the connections, and card provisioning for all routers and switches. A user, e.g., a network engineer, can determine if the network design output by the design tool is a feasible design. In other words, the network engineer can determine whether design meets required equipment constraints, it can handle all traffic demand, and it meets one or more network availability requirements. Further, a network engineer can determine if a feasible design is optimal by determining whether the network design incurs the lowest total cost.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computerized method for automatically designing a switched metro Ethernet data network, the method comprising:
receiving, at a computer system including a computer processor and a computer readable memory accessible to the computer processor, data network information;
receiving, at the computer system, customer demand information;
receiving, at the computer system, equipment information;
receiving, at the computer system, at least one design constraint; and
automatically establishing and storing within the computer readable memory of the computer system a potential topology design for the switched metro Ethernet data network at least partially based on the data network information, the customer demand information, the equipment information, the at least one design constraint, or a combination thereof, wherein a new aggregation node is added at a central office that is located between a plurality of customer nodes and a parent node of the central office in the potential topology design when costs associated with equipment to be added at the central office are less than costs associated with fiber hubbing the plurality of customer nodes to the parent node of the central office.

2. The method of claim 1, wherein the potential topology design for the switched metro Ethernet data network is a tree topology that is rooted at a hub node and that has a plurality of leaves, each leaf being located at a customer location.

3. The method of claim 2, further comprising:
locating an aggregation node with the hub node.

4. The method of claim 3, further comprising:
locating an aggregation node with a redundant hub node.

5. The method of claim 4, further comprising:
locating an aggregation node in at least one other location in the tree topology.

6. The method of claim 5, wherein placement of the aggregation node at the at least one other location in the tree topology is determined by:
determining a first cost of locating the aggregation node at the at least one other location in the tree topology;
determining a second cost of connecting the at least one other location in the tree topology to a parent node of the aggregation node that could potentially be placed at the at least one other location; and
locating the aggregation node at the at least one other location in the tree topology when the second cost is greater than the first cost.

7. The method of claim 5, further comprising:
computing an availability value for each aggregation node in the tree topology other than the hub node and the redundant hub node; and
adding a redundant path from the aggregation node to the hub node when the availability value is less than a predetermined threshold.

8. The method of claim 7, wherein the redundant path is added by:
determining a first path from a particular node to a parent node of the particular node; and
connecting the particular node to a next closest node other than the parent node by a second path that is different from the first path.

9. A computerized method for designing a switched metro Ethernet data network, the method comprising:
establishing and storing, within a computer readable memory accessible to a computer processor of a computer system, a non-redundant tree topology for a switched metro Ethernet data network at least partially within a set of existing nodes;
at least partially based on an availability constraint, adding at least one redundant connection to the non-redundant tree topology; and
adding a new aggregation node at a central office that is located between a plurality of customer nodes and a parent node of the central office in the non-redundant tree topology when costs associated with equipment to be added at the central office are less than costs associated with fiber hubbing the plurality of customer nodes to the parent node of the central office.

10. The method of claim 9, wherein the non-redundant tree topology is located based on data network information, customer demand information, equipment information, at least one design constraint, or a combination thereof.

11. The method of claim 10, wherein the data network information includes at least one of the following: a number of spare nodes, distance information between nodes, locations of core nodes, location of aggregation nodes, configurations of core nodes, configurations of aggregation nodes, port-level connection information, and a list of central offices that can be used for aggregation nodes.

12. The method of claim 10, wherein the customer demand information includes an aggregate bandwidth of customers for at least one serving wire center.

13. The method of claim 10, wherein the equipment information includes at least one of the following: configuration information, cost information, and model information.

14. The method of claim 10, wherein the at least one design constraint is at least one of the following: a distance between two aggregation nodes and an amount of data traffic through a particular aggregation node.

15. The method of claim 14, wherein the non-redundant tree topology is determined by:
initializing the non-redundant tree topology to contain a hub node;
locating a first customer node within a set of customer nodes that is closest to the hub node;
connecting the first customer node to the hub node;
locating a second customer node within the set of customer nodes that is next closest to the hub node; and
connecting the second customer node to the hub node.

16. The method of claim 9, wherein the at least one redundant connection is added to the non-redundant tree topology by:

determining a first path from a customer node to a parent node of the customer node; and connecting the customer node to a next closest node other than the parent node by a second path that is different from the first path.

17. A system for automatically designing a switched metro Ethernet data network, the system comprising:

a computer processor;

a computer readable memory accessible to the computer processor; and a computer program embedded within the memory for designing a switched metro Ethernet data network, the computer program comprising:

instructions to receive one or more user inputs related to the switched metro Ethernet data network;

instructions to generate a non-redundant tree topology for the switched metro Ethernet data network at least partially based on the one or more user inputs;

instructions to add a new aggregation node at a central office that is located between a plurality of customer nodes and a parent node of the central office in the non-redundant tree topology when costs associated with equipment to be added at the central office are less than costs associated with fiber hubbing the plurality of customer nodes to the parent node of the central office;

instructions to add one or more redundant connections to the non-redundant tree topology to create a design; and instructions to output at least one design output related to the design.

18. The system of claim 17, wherein the one or more user inputs include data network information, customer demand information, equipment information, at least one design constraint, or a combination thereof.

19. The system of claim 18, wherein the data network information includes at least one of the following: a number of spare nodes, distance information between nodes, locations of core nodes, location of aggregation nodes, configurations of core nodes, configurations of aggregation nodes, port-level connection information, and a list of central offices that can be used for aggregation nodes.

20. The system of claim 18, wherein the customer demand information includes an aggregate bandwidth of customers for at least one serving wire center.

21. The system of claim 18, wherein the equipment information includes at least one of the following: configuration information, cost information, and model information.

22. The system of claim 18, wherein the at least one design constraint is at least one of the following: a distance between two aggregation nodes and an amount of data traffic through a particular aggregation node.

23. The system of claim 17, wherein the at least one design output includes at least one of the following: a list of line cards for existing aggregation nodes, a list of new aggregation nodes, configuration information for existing and new aggregation nodes, connection information for existing and new aggregation nodes, and cost information.

24. The system of claim 17, wherein the instructions to generate the non-redundant tree topology for the switched metro Ethernet data network comprise:

instructions to initialize a tree topology to contain a hub node;

instructions to locate a first customer node within a set of customer nodes that is proximate to the hub node; and instructions to connect the first customer node to the hub node.

25. The system of claim 24, wherein the instructions to generate the non-redundant tree topology for the switched metro Ethernet data network further comprise:

instructions to locate a second customer node within the set of customer nodes that is next proximate to the hub node; and instructions to connect the second customer node to the hub node.

26. The system of claim 17, wherein the instructions to add one or more redundant connections to the non-redundant tree topology comprise:

instructions to determine a first path from a customer node to a parent node of the customer node; and instructions to connect the customer node to a next closest node other than the parent node by a second path that is different from the first path.

27. A switched metro Ethernet data network, comprising:

at least one hub node;

a plurality of customer nodes connected to the at least one hub node to establish a tree topology;

wherein:

a design of the tree topology is generated using a switched metro Ethernet data network design tool, the switched metro Ethernet data network design tool comprising:

instructions to generate a non-redundant tree topology for the switched metro Ethernet data network at least partially based on one or more user inputs;

instructions to add a new aggregation node at a central office that is located between the plurality of customer nodes and a parent node of the central office in the non-redundant tree topology when costs associated with equipment to be added at the central office are less than costs associated with fiber hubbing the plurality of customer nodes to the parent node of the central office; and instructions to add one or more redundant connections to the non-redundant tree topology to create the design.

28. The switched metro Ethernet data network of claim 27, wherein the design is based on one or more user inputs to the switched metro Ethernet data network design tool.

29. The switched metro Ethernet data network of claim 28, wherein the switched metro Ethernet data network design tool further comprises:

instructions to initialize a tree topology to contain the at least one hub node;

instructions to locate a first customer node within the plurality of customer nodes that is proximate to the at least one hub node; and instructions to connect the first customer node to the at least one hub node.

30. The switched metro Ethernet data network of claim 29, wherein the switched metro Ethernet data network design tool further comprises:

instructions to locate a second customer node within the plurality of customer nodes that is next proximate to the at least one hub node; and instructions to connect the second customer node to the at least one hub node.

31. The switched metro Ethernet data network of claim 30, wherein the switched metro Ethernet data network design tool further comprises:

instructions to determine a first path from a customer node to a parent node of the customer node; and instructions to connect the customer node to a next closest node other than the parent node by a second path that is different from the first path.

* * * * *